(12) United States Patent
Wei et al.

(10) Patent No.: US 8,342,807 B2
(45) Date of Patent: Jan. 1, 2013

(54) ELEVATION ANGLE ADJUSTMENT STRUCTURE FOR A SHAFT OF A WIND POWER GENERATOR

(75) Inventors: Jhen-You Wei, Taichung (TW); Shin-Hao Chen, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 613 days.

(21) Appl. No.: 12/646,825

(22) Filed: Dec. 23, 2009

(65) Prior Publication Data

US 2011/0150654 A1 Jun. 23, 2011

(51) Int. Cl.
*F03D 7/02* (2006.01)

(52) U.S. Cl. ............................................ 416/147
(58) Field of Classification Search .............. 416/9, 147, 416/148, 149, 150, 246
See application file for complete search history.

(56) References Cited

U.S. PATENT DOCUMENTS

2008/0304969 A1* 12/2008 Fu .................................. 416/148

* cited by examiner

*Primary Examiner* — Richard Edgar
(74) *Attorney, Agent, or Firm* — Guice Patents PLLC

(57) ABSTRACT

An elevation angle adjustment structure for a shaft of a wind power generator, including a shaft bridged between two piers and an elevation angle adjustment unit disposed on one of the piers. The elevation angle adjustment unit serves to incline the shaft from a horizontal position and adjust the elevation angle of the shaft.

5 Claims, 6 Drawing Sheets

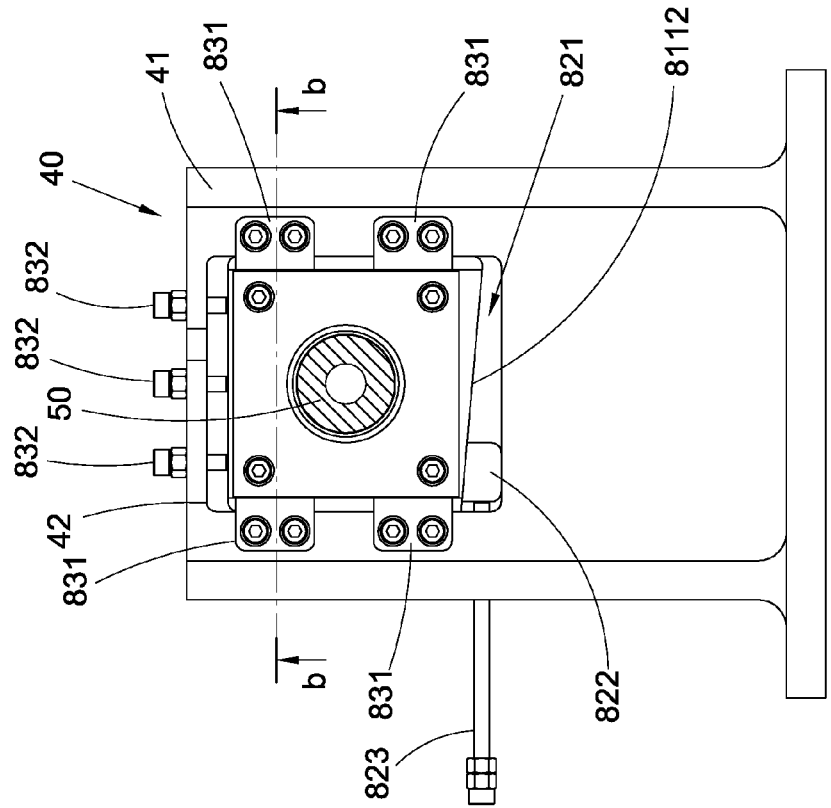
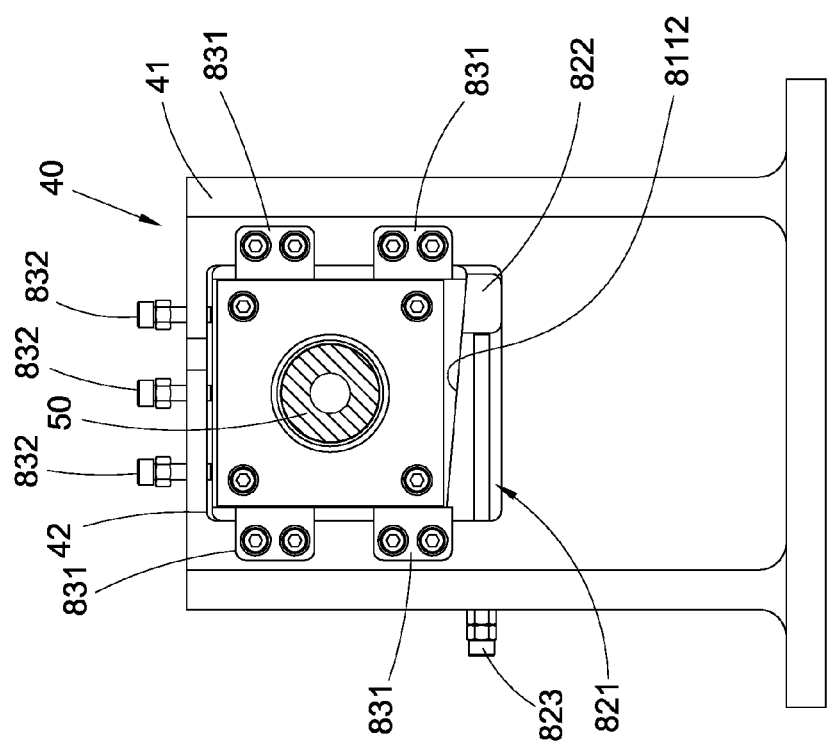

ELEVATION ANGLE ADJUSTMENT STRUCTURE FOR A SHAFT OF A WIND POWER GENERATOR

BACKGROUND OF THE INVENTION

The present invention relates generally to wind power generation technique, and more particularly to an elevation angle adjustment structure for a shaft of a wind power generator.

Energy shortage is a critical issue in the modern highly industrialized world. Wind power pertains to green energy resource that can be permanently utilized. Therefore, various wind power generation systems have been developed instead of traditional power generation systems. However, it is known that the atmospheric airflows often flow in a direction with an inclination angle rather than in parallel to the horizontal face. Therefore, in order to make the blades of the wind power generator right face the airflows to enlarge contact area between the blades and the airflows, it is often necessary to position the wind power generator at an inclination angle. FIG. 1 shows a conventional wind power generation system including a wind power generation unit 1 arranged on an inclined platform 2. Under such circumstance, the shaft 3 of the wind power generator has an elevation angle α, whereby the blades connected to the free end of the shaft can right face the wind to increase power generation efficiency. Also, the blades are prevented from tilting due to improper wind pressure. In this case, the blades will not collide the tower support to cause damage.

However, the airflows will have different flowing directions in different regions with different geometric configurations. Therefore, the inclination angles of the airflows vary with the regions. As a result, the inclined platform 2 can hardly provide suitable elevation angle for the shaft in adaptation to a different environment. Also, it is impossible for such inclined platform 2 to flexibly change the elevation angle with the change of seasons. Therefore, the effect achievable by the conventional technique is limited and the power generation efficiency can be hardly increased. Also, the safety in use of the wind power generation unit cannot be ensured.

SUMMARY OF THE INVENTION

It is therefore a primary object of the present invention to provide an elevation angle adjustment structure for a shaft of a wind power generator. By means of the elevation angle adjustment structure, the shaft of the wind power generator can be adjusted in accordance with the direction of the airflow. Accordingly, the blades mounted at the end of the shaft can right face the wind to increase power generation efficiency and ensure safety in use of the wind power generator.

To achieve the above and other objects, the elevation angle adjustment structure of the present invention includes: a bed; two piers uprightly disposed on an upper face of the bed and spaced from each other; a shaft bridged between the piers, a first axial end and a second axial end of the shaft respectively outward extending from the piers in reverse directions; a propeller assembly fixedly mounted on the first axial end of the shaft and synchronously rotatable with the shaft; and a generator fixedly disposed on the upper face of the bed and coupled with the second axial end of the shaft for converting dynamic energy of the shaft into electric energy. The elevation angle adjustment structure is characterized in that the elevation angle adjustment structure further includes: an elevation angle adjustment unit, the elevation angle adjustment unit including a frame body slidably disposed on one of the piers and adjustable in height in a direction normal the horizontal face, the elevation angle adjustment unit further including an adjustment section for adjusting the height of the position of the frame body on the pier, the elevation angle adjustment unit further including a locating section for locating the frame body at the height after adjusted; and a shaft coupling section bendably connected between the shaft and a central shaft of the generator for transmitting the dynamic energy of the shaft to the central shaft of the generator.

The present invention can be best understood through the following description and accompanying drawings, wherein:

BRIEF DESCRIPTION OF THE DRAWINGS

FIG. 5 is a plane view of the preferred embodiment of the present invention, showing that the bearing seat is positioned in a higher position;

FIG. 6 is a plane view of the preferred embodiment of the present invention, showing that the bearing seat is positioned in a lower position after adjusted.

DETAILED DESCRIPTION OF THE PREFERRED EMBODIMENT

Figure 1:
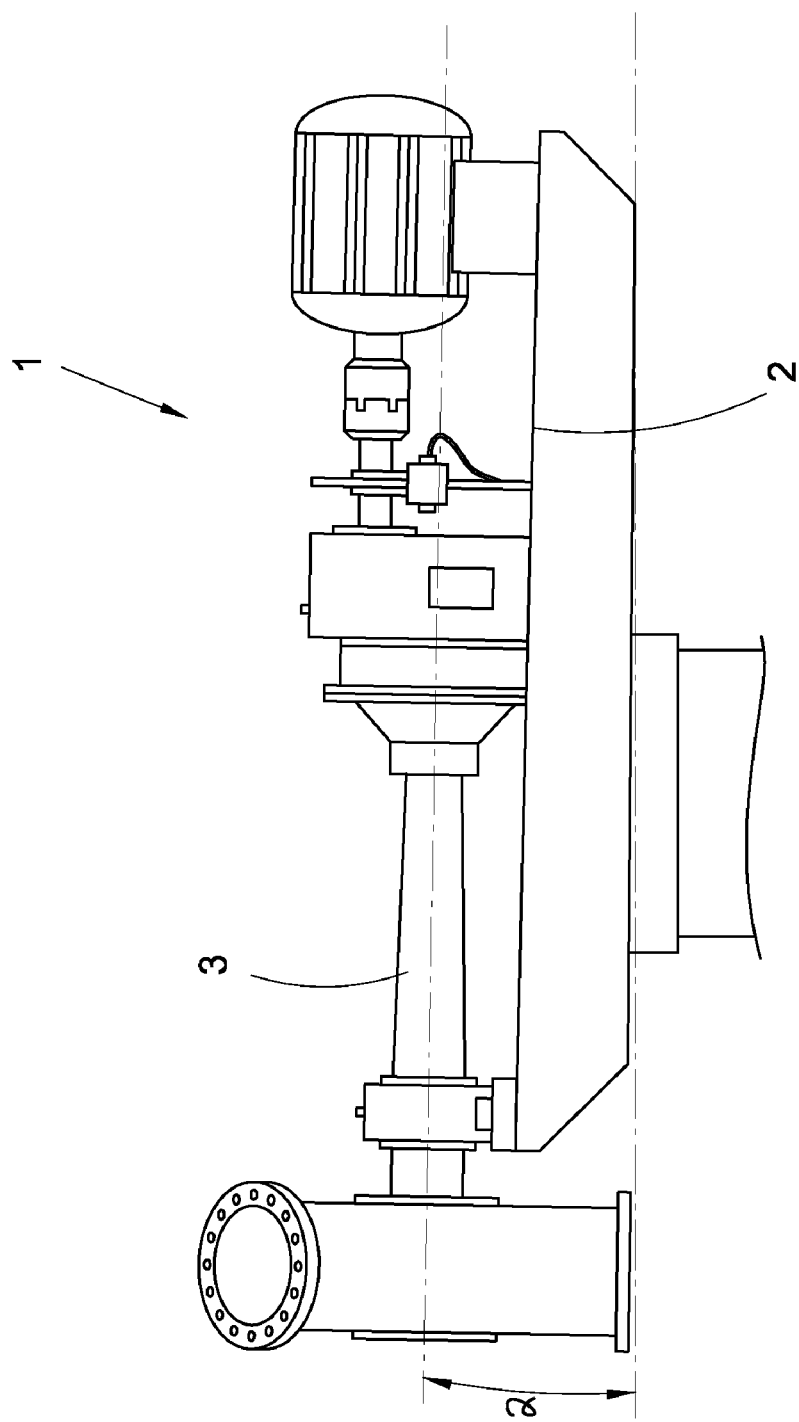
FIG. 1 is a plane view of a conventional wind power generation system.
Figure 2:
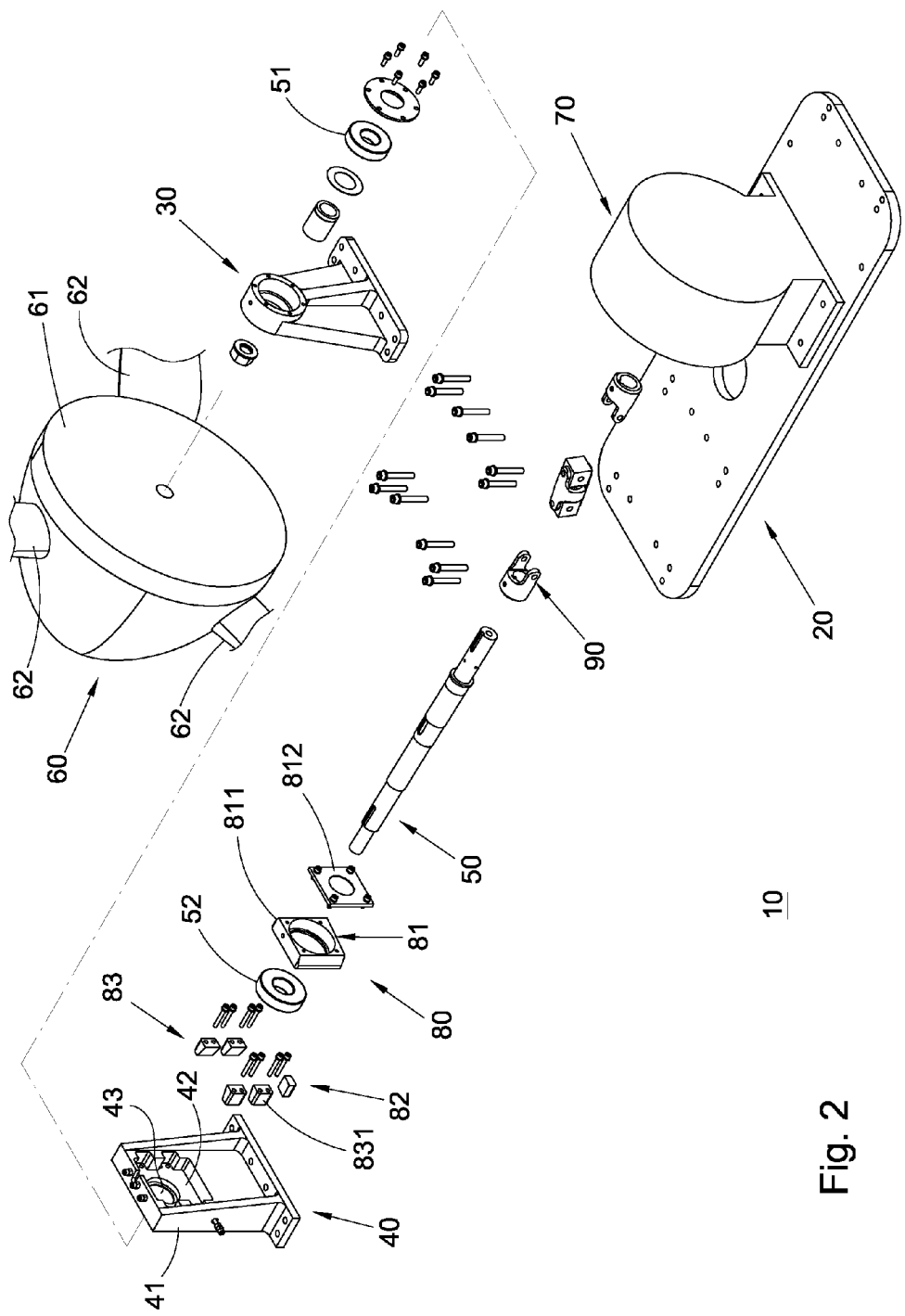
FIG. 2 is a perspective exploded view of a preferred embodiment of the present invention.
Figure 3:
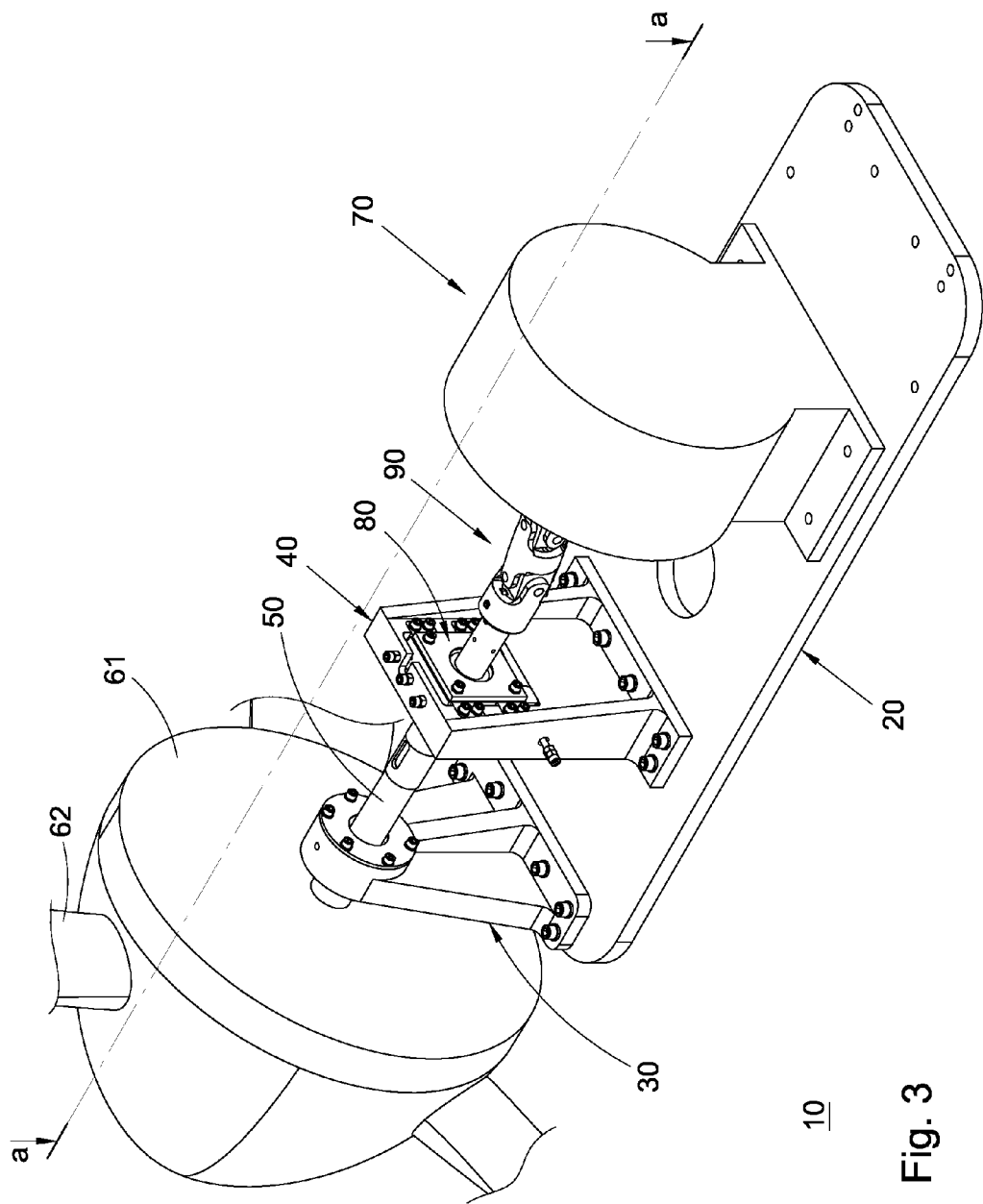
FIG. 3 is a perspective assembled view of the preferred embodiment of the present invention.
Figure 4:
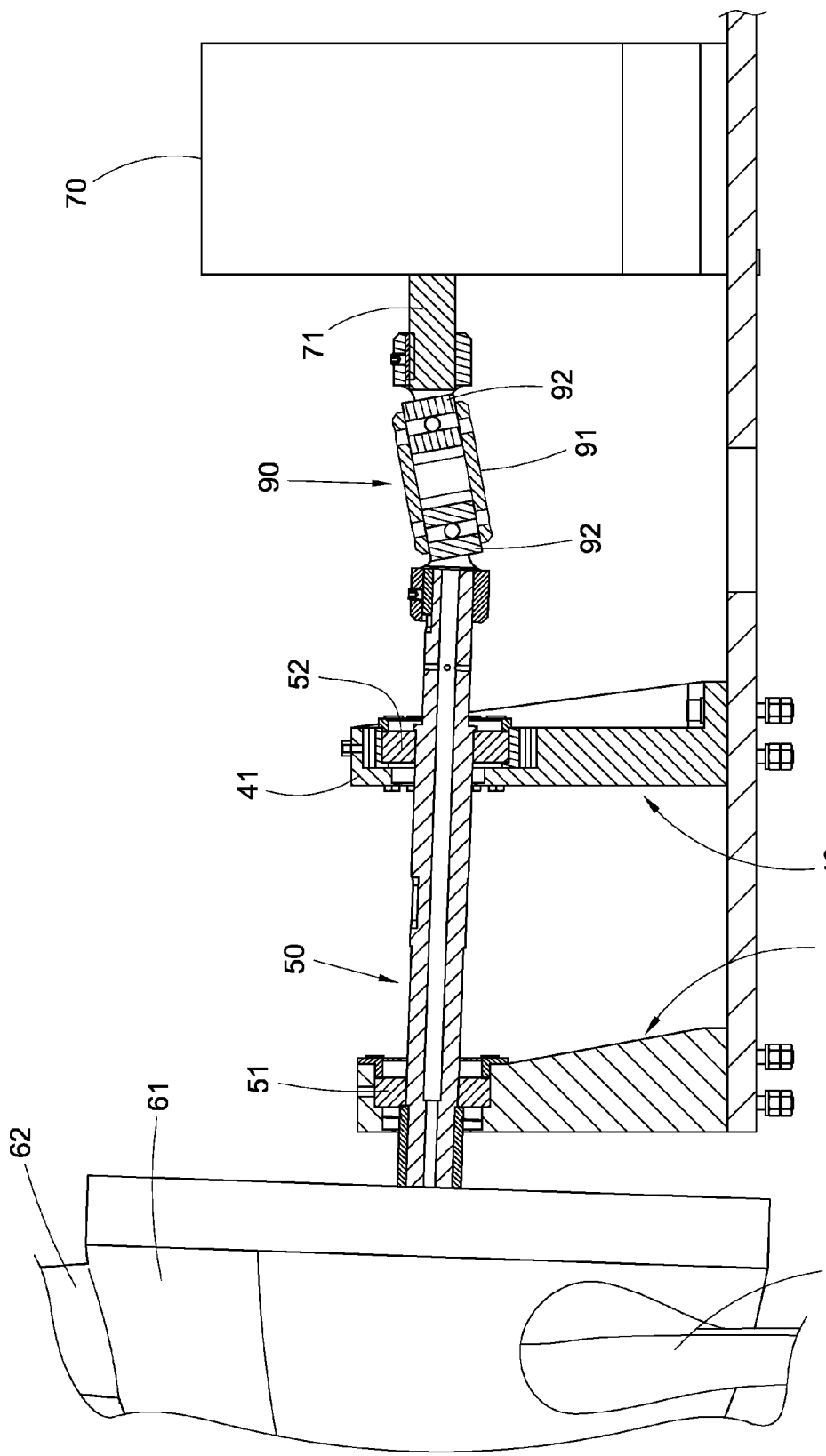
FIG. 4 is a sectional view taken along line a-a of FIG. 3.
Figure 7:
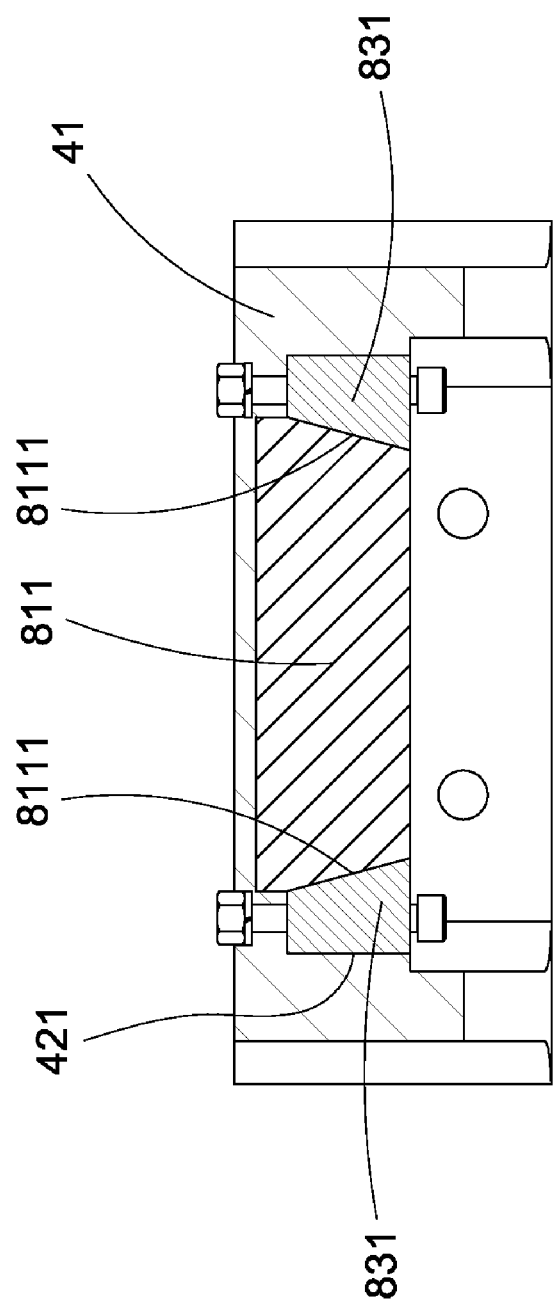
FIG. 7 is a sectional view taken along line b-b of FIG. 6.

Please refer to FIGS. 2 to 7. According to a preferred embodiment of the present invention, the elevation angle adjustment structure 10 for the shaft of the wind power generator includes a bed 20, a first pier 30, a second pier 40, a shaft 50, a propeller assembly 60, a generator 70, an elevation angle adjustment unit 80 and a shaft coupling section 90. The bed 20, the first pier 30, the shaft 50, the propeller assembly 60 and the generator 70 pertain to prior art and thus will be simply schematically described hereinafter.

The bed 20 is a substantially rectangular board body horizontally supported in a high position.

The piers 30, 40 are uprightly disposed on an upper face of the bed 20 in parallel to each other and spaced by a certain distance. The first pier 30 is positioned at a lengthwise end of the bed 20. The second pier 40 has a pier body 41. A right side face of the pier body 41 is recessed to form a substantially quadrangular cavity 42. A shaft hole 43 extends through the pier body 41 from a wall of the cavity 42.

A middle section of the shaft 50 is rotatably fitted through the piers 30, 40 via two bearings 51, 52 and bridged between the piers 30, 40. A first axial end and a second axial end of the shaft 50 respectively outward extend from the piers 30, 40 in reverse directions. Accordingly, the shaft 50 is rotatably supported with the piers 30, 40.

The propeller assembly 60 includes a hub 61 fixedly mounted on the first axial end of the shaft 50. Several blades 62 are disposed on a circumference of the hub 61 at equal intervals.

The generator 70 is fixedly disposed on the bed 20 and positioned on right side of the second pier 40. A central shaft 71 of the generator 70 is coupled with the second axial end of the shaft 50.

The elevation angle adjustment unit 80 is disposed on the second pier 40 and composed of a frame body 81, an adjustment section 82 and a locating section 83.

The frame body 81 has a hollow quadrangular bearing seat 811 with a dimension smaller than that of the cavity 42. The bearing seat 811 is slidably disposed in the cavity 42. The bearing 52 of the shaft 50 is inlaid in the bearing seat 811. A ring-shaped end cap 812 is disposed at one end of the bearing seat 811 to cover and retain the bearing 52 in the frame body 81. The bearing seat 811 has two beveled side faces 8111 normal the horizontal face. The beveled side faces 8111 diverge from the end cap 812 to the other end of the bearing seat 811 to form two slopes. The bearing seat 811 further has an inclined bottom face 8112 inclined from the horizontal face.

The adjustment section 82 has a slide way 821 defined between the bottom face 8112 of the bearing seat 811 and a bottom wall of the cavity 42 that faces the bottom face 8112. A wedge-shaped adjustment block 822 having a slope is slidably disposed in the slide way 821 with its slope facing up. The slope of the adjustment block 822 contacts with and attaches to the bottom face 8112 of the bearing seat 811. An adjustment bolt 823 having a rear end is screwed through the second pier 40 with its rear end in abutment with the adjustment block 822. Accordingly, the adjustment bolt 823 can drive the adjustment block 822 to linearly reciprocally move within the slide way 821.

The locating section 83 includes several wedge-shaped locating blocks 831 sandwiched between the side faces 8111 of the bear seat 811 and the walls 421 of the cavity 42 that face the side faces 8111. The locating blocks 831 are locked with bolts to apply tightening force to the side faces of the bearing seat 811 for fixing the bearing seat 811. Several locating bolts 832 are screwed through the second pier 40 from upper side to lower side thereof to abut against an upper face of the bearing seat 811.

The shaft coupling section 90 can be a universal joint. Two ends of the shaft coupling section 90 are respectively connected with the second axial end of the shaft 50 and the free end of the central shaft 71 of the generator 70. To speak more specifically, two ends of a subsidiary shaft 91 are respectively connected with two universal joints 92, 93. The two universal joints 92, 93 are respectively connected with the shaft 50 and the central shaft 71.

According to the above arrangement, when adjusting the elevation angle of the shaft with the elevation angle adjustment structure 10, the bearing seat 811 is first released from the locating section 83. Then the adjustment block 822 is moved to change the height of the position of the bearing seat 811 by means of wedging effect. After the adjustment is completed, the bearing seat 811 is again located at a new height by means of the locating section 83. The first axial end of the shaft 50 is fixed in the first pier 30 and restricted to a position at a fixed height. On the other hand, the second axial end of the shaft 50 can be adjusted in height by means of changing the height of the position of the bearing 52. Accordingly, the shaft 50 can be inclined from the horizontal face by a certain elevation angle to make the blades right face the wind for achieving greatest power generation efficiency. When the shaft 50 is rotated, the dynamic energy of the shaft 50 can be transmitted to the generator 70 via the shaft coupling section 90 and converted into electric energy.

It should be noted that the elevation angle of the shaft 50 is adjustable with the bed 20 keeping horizontal. Moreover, the elevation angle of the shaft 50 is changeable without affecting the horizontality of the central shaft of the generator 70. Accordingly, the rotary shaft of the elevation angle adjustment structure 10 has a horizontal section and an inclined section with a certain elevation angle. Therefore, the elevation angle adjustment structure 10 of the present invention is applicable to those wind power generators necessitating horizontal rotation. Accordingly, in comparison with the conventional technique, the elevation angle adjustment structure 10 of the present invention can be more conveniently and widely used. Also, the safety in use of the wind power generator can be ensured.

The above embodiment is only used to illustrate the present invention, not intended to limit the scope thereof. Many modifications of the above embodiment can be made without departing from the spirit of the present invention.

What is claimed is:

1. An elevation angle adjustment structure for a shaft of a wind power generator, comprising:
  a bed;
  two piers uprightly disposed on an upper face of the bed and spaced from each other;
  a shaft bridged between the piers, a first axial end and a second axial end of the shaft respectively outward extending from the piers in reverse directions;
  a propeller assembly fixedly mounted on the first axial end of the shaft and synchronously rotatable with the shaft; and
  a generator fixedly disposed on the upper face of the bed and coupled with the second axial end of the shaft for converting dynamic energy of the shaft into electric energy, the elevation angle adjustment structure being characterized in that the elevation angle adjustment structure further comprising:
  an elevation angle adjustment unit, the elevation angle adjustment unit including a frame body slidably disposed on one of the piers and adjustable in height in a direction normal the horizontal face, the elevation angle adjustment unit further including an adjustment section for adjusting the height of the position of the frame body on the pier, the elevation angle adjustment unit further including a locating section for locating the frame body at the height after adjusted; and
  a shaft coupling section bendably connected between the shaft and a central shaft of the generator for transmitting the dynamic energy of the shaft to the central shaft of the generator.

2. The elevation angle adjustment structure for the shaft of the wind power generator as claimed in claim 1, wherein the pier on which the frame body is disposed has a pier body, one side face of the pier body being recessed to form a cavity, the frame body having a bearing seat with a dimension smaller than that of the cavity, the bearing seat being slidably disposed in the cavity, the adjustment section having a slide way defined between a bottom face of the bearing seat and a bottom wall of the cavity, the adjustment section further having an adjustment block slidably disposed in the slide way, the adjustment block having an upper face in abutment with the bottom face of the bearing seat, the adjustment block being reciprocally movable between a lifting position and a lowering position, when the adjustment block is positioned in the lifting position, the bearing seat being lifted to a first position at a first height, when the adjustment block is positioned in the lowering position, the bearing seat being lowered to a second position at a second height, the first height being higher than the second height.

3. The elevation angle adjustment structure for the shaft of the wind power generator as claimed in claim 2, wherein the adjustment block is a wedge-shaped block having an upper slope, the bottom face of the bearing seat being an inclined face, whereby the upper slope of the adjustment block slidably contacts with and attaches to the inclined bottom face of the bearing seat.

4. The elevation angle adjustment structure for the shaft of the wind power generator as claimed in claim 2, wherein the locating section includes several locating blocks sandwiched between side faces of the bearing and walls of the cavity, the locating blocks serving to tighten and locate the bearing seat.

5. The elevation angle adjustment structure for the shaft of the wind power generator as claimed in claim 1, wherein the shaft coupling section is a universal joint.

* * * * *